United States Patent
Hong et al.

(10) Patent No.: US 9,449,759 B2
(45) Date of Patent: Sep. 20, 2016

(54) MULTILAYER CERAMIC CAPACITOR AND BOARD HAVING THE SAME MOUNTED THEREON

(71) Applicant: SAMSUNG ELECTRO-MECHANICS CO., LTD., Suwon-Si, Gyeonggi-Do (KR)

(72) Inventors: Kyung Pyo Hong, Suwon-Si (KR); Doo Young Kim, Suwon-Si (KR); Chang Hoon Kim, Suwon-Si (KR); Sang Hyun Park, Suwon-Si (KR); Hae Sock Chung, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/255,397

(22) Filed: Apr. 17, 2014

(65) Prior Publication Data
US 2015/0096795 A1    Apr. 9, 2015

(30) Foreign Application Priority Data
Oct. 8, 2013    (KR) .......................... 10-2013-0120073

(51) Int. Cl.
*H01G 2/06*    (2006.01)
*H01G 4/012*    (2006.01)
(Continued)

(52) U.S. Cl.
CPC .............. *H01G 2/065* (2013.01); *H01G 4/012* (2013.01); *H01G 4/30* (2013.01); *H01G 4/12* (2013.01)

(58) Field of Classification Search
USPC ................... 361/321.1, 321.2, 328
See application file for complete search history.

(56) References Cited

U.S. PATENT DOCUMENTS 4,949,217 A * 8/1990 Ngo ............................. 361/328
5,763,911 A * 6/1998 Matthews .............. H01G 4/306
257/202

(Continued)

FOREIGN PATENT DOCUMENTS

JP    2000-277883 A    10/2000
JP    2004-273875 A    9/2004

(Continued)

OTHER PUBLICATIONS

Korean Office Action issued in Korean Application No. 10-2013-0120073 dated Mar. 6, 2015, with English Translation.

(Continued)

*Primary Examiner* — Jeremy C Norris
*Assistant Examiner* — Muhammed Azam
(74) *Attorney, Agent, or Firm* — McDermott Will & Emery LLP

(57) ABSTRACT

A multilayer ceramic capacitor may include: a ceramic body including dielectric layers; first and second internal electrodes disposed in the ceramic body; and first and second external electrodes formed to end surfaces of the ceramic body. The ceramic body may includes an active layer, a capacitance formation portion, and a cover layer, a non-capacitance formation portion, the cover layer includes a plurality of dummy electrode layers. When the number of the first and second internal electrodes is defined as AL, a thickness of each of the first and second internal electrodes is defined as AT, a thickness of each of the dummy electrode layers is defined as DT, and the number of the dummy electrode layers is defined as DL, DL is equal to {(T×x)−(AL×AT)}/DT, x being 9.0% or more.

6 Claims, 2 Drawing Sheets

(51) Int. Cl.
*H01G 4/30* (2006.01)
*H01G 4/12* (2006.01)

(56) References Cited

U.S. PATENT DOCUMENTS

| | | | | |
|---|---|---|---|---|
| 5,835,338 | A * | 11/1998 | Suzuki | H01G 4/30 361/301.4 |
| 6,377,439 | B1 * | 4/2002 | Sekidou | H01G 4/005 361/303 |
| 2004/0042156 | A1 * | 3/2004 | Devoe et al. | 361/321.2 |
| 2005/0094351 | A1 * | 5/2005 | Kobayashi | H01G 4/30 361/306.3 |
| 2005/0128680 | A1 * | 6/2005 | Shin | H01G 4/1227 361/306.3 |
| 2005/0201040 | A1 * | 9/2005 | Ahiko | H01G 4/005 361/321.2 |
| 2006/0203420 | A1 * | 9/2006 | Okuyama | H01G 4/232 361/271 |
| 2007/0025054 | A1 | 2/2007 | Tonogai et al. | |
| 2007/0047175 | A1 * | 3/2007 | Sato | H01G 4/012 361/303 |
| 2012/0019981 | A1 * | 1/2012 | Yoshida | H01C 1/1406 361/321.1 |
| 2012/0134068 | A1 * | 5/2012 | Chae et al. | 361/321.2 |
| 2012/0188684 | A1 * | 7/2012 | Akazawa | H01G 4/012 361/321.2 |
| 2012/0320495 | A1 * | 12/2012 | Akazawa | H01G 4/30 361/321.2 |
| 2013/0033154 | A1 * | 2/2013 | Sakuratani | H01G 4/30 310/366 |
| 2013/0208401 | A1 * | 8/2013 | Shirakawa | H01G 13/06 361/305 |
| 2013/0241361 | A1 | 9/2013 | Lee et al. | |
| 2013/0329334 | A1 * | 12/2013 | Hiramatsu | H01G 4/12 361/272 |

FOREIGN PATENT DOCUMENTS

| | | |
|---|---|---|
| JP | 2007-042743 A | 2/2007 |
| JP | 2013-093374 A | 5/2013 |
| KR | 10-2013-0104338 A | 9/2013 |

OTHER PUBLICATIONS

R. Al-Saffar, R. Freer, I. Tribick and P. Ward; "Flexure Strength of Multilayer Ceramic Capacitors"; pp. 241 through 245; available as published 1999 in British Ceramic Transactions, vol. 98, No. 5; http://www.maneyonline.com/doi/abs/10.1179/096797899680516.†

Mohammadreza Keimasi; Flex Cracking and Temperature-Humidity-Bias Effects on Reliability of Multilayer Ceramic Capacitors; Abstract, Title Page, pp. i through xv, pp. 1 through 163; available as published Dec. 22, 2006; Thesis submitted to the Faculty of the Graduate School of the University of Maryland, College Park in partial fulfillment of the requirements for the degree of Doctor of Philosophy; http://drum.lib.umd.edu/handle/1903/4257.†

\* cited by examiner
† cited by third party

A-A'

MULTILAYER CERAMIC CAPACITOR AND BOARD HAVING THE SAME MOUNTED THEREON

CROSS-REFERENCE TO RELATED APPLICATION

This application claims the benefit of Korean Patent Application No. 10-2013-0120073 filed on Oct. 8, 2013, with the Korean Intellectual Property Office, the disclosure of which is incorporated herein by reference.

BACKGROUND

The present disclosure relates to a multilayer ceramic capacitor and a board having the same mounted thereon.

In accordance with the recent trend toward miniaturization of electronic products, demand for a multilayer ceramic electronic component having a small size and high capacitance has increased.

Therefore, dielectric layers and internal electrodes are thinned and stacked in increasing amounts through various methods. Recently, in accordance with a reduction in a thickness of the dielectric layer, multilayer ceramic electronic components having an increased amount of stacked layers have been manufactured.

In addition, recently, ceramic electronic components having dielectric layers formed using a fine ceramic powder for thinness of the dielectric layer have been manufactured.

Further, in accordance with miniaturization and an increase in capacitance of electronic components, a thickness of a cover layer, a non-capacitance formation part, has also been decreased.

Meanwhile, as multilayer ceramic electronic components has been used in fields of application requiring high reliability such as vehicles, medical devices, and the like, demands have been made for multilayer ceramic electronic components to have high reliability.

In securing high reliability, defects such as cracks generated in components due to external impacts, malfunction of an apparatus caused by the occurrence of the cracks, and the like may be present.

Research into the development of a technology and a product for preventing a warpage crack from being generated in the multilayer ceramic electronic component has been continuously conducted, but there is a limitation.

Specifically, in order to prevent the occurrence of short-circuits due to warpage cracks, a method of increasing a margin in a length direction, a method of using a lead frame during a mounting process, a method of manufacturing an external electrode using an impact absorbing material, or the like, has been used.

However, it is difficult to apply the method of increasing the margin in the length direction to a high capacitance multilayer ceramic electronic component, and a method of applying a polymer material such as epoxy or the like, to an external electrode may also have a limitation in securing warpage strength.

Further, in the method of using a metal lead frame, a high manufacturing cost may occur and a mounting area and a height may be restricted.

Therefore, research into technologies of improving bending strength characteristics while increasing strength against external impacts has been still demanded.

SUMMARY

An aspect of the present disclosure may provide a multilayer ceramic capacitor and a board having the same mounted thereon.

According to an aspect of the present disclosure, a multilayer ceramic capacitor may include: a ceramic body including dielectric layers; first and second internal electrodes disposed in the ceramic body to face each other, having the dielectric layers interposed therebetween; and first and second external electrodes formed to cover both end surfaces of the ceramic body, wherein the ceramic body includes an active layer, a capacitance formation portion, and a cover layer, a non-capacitance formation portion, formed on at least one of upper and lower surfaces of the active layer, the cover layer includes a plurality of dummy electrode layers including central portions thereof disposed in positions corresponding to edges of the first and second external electrodes formed on upper and lower surfaces of the ceramic body, and having a predetermined length, and when a thickness of the ceramic body is defined as T, the number of the first and second internal electrodes is defined as AL, a thickness of each of the first and second internal electrodes is defined as AT, a thickness of each of the dummy electrode layers is defined as DT, and the number of the dummy electrode layers stacked in the cover layer is defined as DL, DL is equal to $\{(T \times x)-(AL \times AT)\}/DT$, x being 9.0% or more.

The number DL of the stacked dummy electrode layers may be in a range of 42 to 92.

x may be in a range of 9.0% to 16.2%.

The central portions of the dummy electrode layers may be disposed in the positions corresponding to the edges of the first and second external electrodes formed on the upper and lower surfaces of the ceramic body, and the dummy electrode layers may have a length of 40 µm or more.

The dummy electrode layers may be exposed to the both end surfaces of the ceramic body.

According to another aspect of the present disclosure, a multilayer ceramic capacitor may include: a ceramic body including dielectric layers; first and second internal electrodes disposed in the ceramic body to face each other, having the dielectric layers interposed therebetween; and first and second external electrodes formed to cover both end surfaces of the ceramic body, wherein the ceramic body includes an active layer, a capacitance formation portion, and a cover layer, a non-capacitance formation portion, formed on at least one of upper and lower surfaces of the active layer, the cover layer includes a plurality of dummy electrode layers including central portions thereof disposed in positions corresponding to edges of the first and second external electrodes formed on upper and lower surfaces of the ceramic body, and having a predetermined length, and when the number of the dummy electrode layers stacked in the cover layer is defined as DL, DL is in a range of 42 to 92.

The central portions of the dummy electrode layers may be disposed in the positions corresponding to the edges of the first and second external electrodes formed on the upper and lower surfaces of the ceramic body, and the dummy electrode layers may have a length of 40 µm or more.

The dummy electrode layers may be exposed to the both end surfaces of the ceramic body.

When a thickness of the ceramic body is defined as T, the number of the first and second internal electrodes is defined as AL, a thickness of each of the first and second internal electrodes is defined as AT, and a thickness of each of the dummy electrode layers is defined as DT, DL may be equal to $\{(T \times x)-(AL \times AT)\}/DT$, x being in a range of 9.0% to 16.2%.

According to another aspect of the present disclosure, a board having a multilayer ceramic capacitor mounted thereon may include: a printed circuit board having first and second electrode pads formed thereon; and the multilayer ceramic capacitor mounted on the printed circuit board, and including a ceramic body including dielectric layers; first and second internal electrodes disposed in the ceramic body to face each other, having the dielectric layers interposed therebetween; and first and second external electrodes formed to cover both end surfaces of the ceramic body, wherein the ceramic body includes an active layer, a capacitance formation portion, and a cover layer, a non-capacitance formation portion, formed on at least one of upper and lower surfaces of the active layer, the cover layer includes a plurality of dummy electrode layers including central portions thereof disposed in positions corresponding to edges of the first and second external electrodes formed on upper and lower surfaces of the ceramic body, and having a predetermined length, and when a thickness of the ceramic body is defined as T, the number of the first and second internal electrodes is defined as AL, a thickness of each of the first and second internal electrodes is defined as AT, a thickness of each of the dummy electrode layers is defined as DT, and the number of the dummy electrode layers stacked in the cover layer is defined as DL, DL is equal to $\{(T \times x)-(AL \times AT)\}/DT$, x being 9.0% or more.

The number DL of the stacked dummy electrode layers may be in a range of 42 to 92.

x may be in a range of 9.0% to 16.2%.

The central portions of the dummy electrode layers may be disposed in the positions corresponding to the edges of the first and second external electrodes formed on the upper and lower surfaces of the ceramic body, and the dummy electrode layers may have a length of 40 μm or more.

The dummy electrode layers may be exposed to the both end surfaces of the ceramic body.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
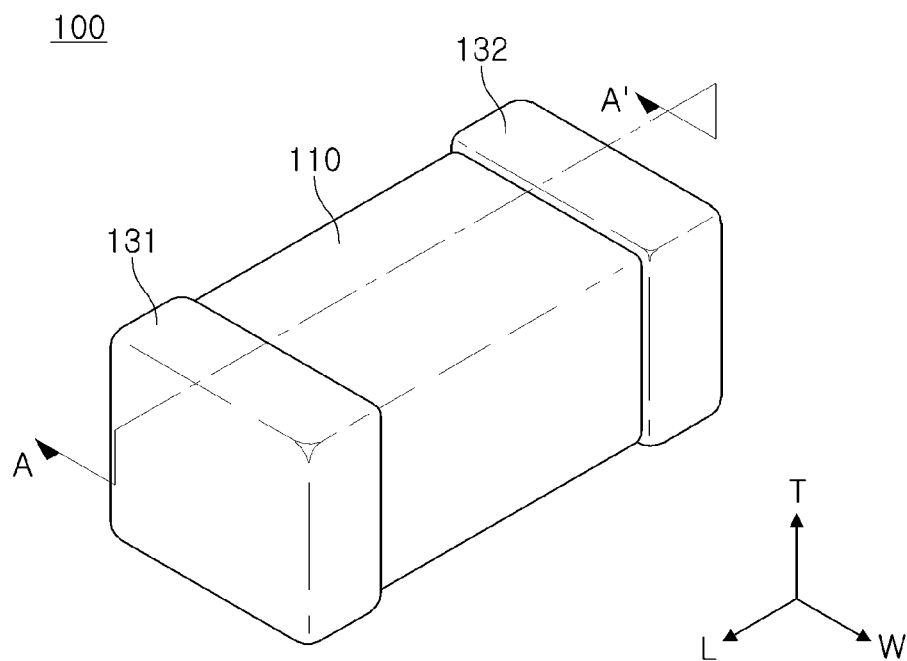
FIG. 1 is a perspective view schematically showing a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements maybe exaggerated for clarity, and the same reference numerals will be used throughout to designate the same or like elements.

Directions of a hexahedron will be defined in order to clearly describe exemplary embodiments of the present disclosure. L, W and T shown in the accompanying drawings refer to a length direction, a width direction, and a thickness direction of the hexahedron, respectively. Here, the thickness direction may be used to have the same concept as a direction in which dielectric layers are stacked.

Further, in the embodiment, for convenience of explanation, surfaces of a ceramic body on which first and second external electrodes are formed in the length direction of the ceramic body may be defined as both end surfaces, and surfaces of the ceramic body connected to be perpendicular to the both end surfaces may be defined as both side surfaces.

FIG. 1 is a perspective view schematically showing a multilayer ceramic capacitor according to an exemplary embodiment of the present disclosure.

Figure 2:
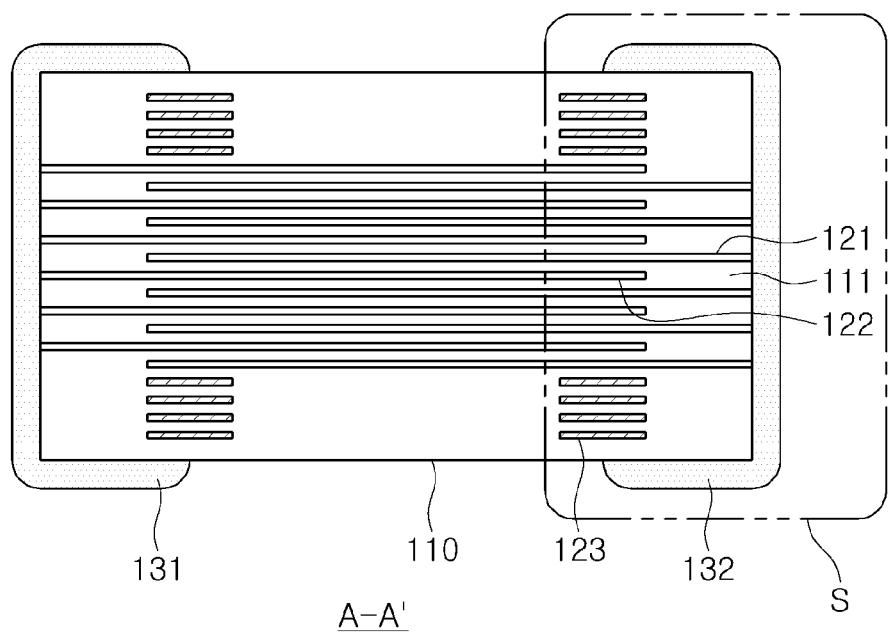
FIG. 2 is a cross-sectional view taken along line A-A' of FIG. 1.

FIG. 2 is a cross-sectional view taken along line A-A' of FIG. 1.

Figure 3:
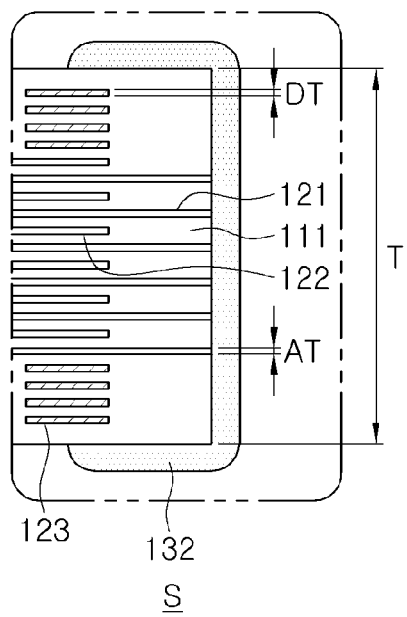
FIG. 3 is an enlarged view of portion S of FIG. 2.

FIG. 3 is an enlarged view of portion S of FIG. 2. Referring to FIGS. 1 through 3, a multilayer ceramic electronic component 100 according to an exemplary embodiment of the present disclosure may include: a ceramic body 110 including dielectric layers 111; first and second internal electrodes disposed in the ceramic body to face each other, having the dielectric layers interposed therebetween; and first and second external electrodes formed to cover both end surfaces of the ceramic body, wherein the ceramic body includes an active layer, a capacitance formation portion, and a cover layer, a non-capacitance formation portion, formed on at least one of upper and lower surfaces of the active layer, the cover layer includes a plurality of dummy electrode layers including central portions thereof disposed in positions corresponding to edges of the first and second external electrodes formed on upper and lower surfaces of the ceramic body, and having a predetermined length, and when a thickness of the ceramic body is defined as T, the number of the first and second internal electrodes is defined as AL, a thickness of each of the first and second internal electrodes is defined as AT, a thickness of each of the dummy electrode layers is defined as DT, and the number of the dummy electrode layers stacked in the cover layer is defined as DL, DL is equal to $\{(T \times x)-(AL \times AT)\}/DT$, x being 9.0% or more.

The ceramic body 110 may be formed by stacking a plurality of dielectric layers 111 and then sintering the stacked dielectric layers. In this case, a shape and a dimension of the ceramic body 110 and the number of stacked dielectric layers 111 are not limited to those of the present embodiment shown in the accompanying drawings.

In addition, the plurality of dielectric layers 111 configuring the ceramic body 110 may be in a sintered state, and the dielectric layers 111 adjacent to each other may be integrated so as not to confirm a boundary therebetween without using a scanning electron microscope (SEM).

The ceramic body 110 may be configured of the active layer as a part contributing to capacitance formation of the capacitor and an upper or lower cover layer formed on an upper or lower portion of the active layer as an upper or lower margin part.

The active layer may be formed by repeatedly stacking the plurality of first and second internal electrodes 121 and 122, having the dielectric layers 111 interposed therebetween.

In this case, a thickness of the dielectric layers 111 may be optionally changed according to a capacitance design of the multilayer ceramic capacitor 100. A thickness of a single dielectric layer may be preferably 0.1 to 10.0 μm after a sintering process. However, the present disclosure is not limited thereto.

Further, the dielectric layers 111 may contain a ceramic powder having high permittivity, for example, a barium titanate ($BaTiO_3$) based powder or a strontium titanate ($SrTiO_3$) based powder, or the like, but the present disclosure is not limited thereto.

The upper or lower cover layer may have the same material and configuration as those of the dielectric layers 111 except that the internal electrodes are not included therein.

The upper or lower cover layer maybe formed by stacking a single dielectric layer or two or more dielectric layers on the upper or lower surface of the active layer in a vertical direction, and may basically serve to prevent the first and second internal electrodes 121 and 122 from being damaged by physical or chemical stress.

Meanwhile, the first and second internal electrodes 121 and 122, pairs of electrodes having different polarities from each other, may be formed by printing a conductive paste containing a conductive metal on the respective dielectric layers 111 at a predetermined thickness.

In addition, the first and second internal electrodes 121 and 122 may be stacked in the direction in which the dielectric layers 111 are stacked, so as to be alternately exposed to the both end surfaces of the ceramic body, and may be electrically insulated from each other by the dielectric layers 111 disposed therebetween.

That is, the first and second internal electrodes 121 and 122 may be electrically connected to the first and second external electrodes 131 and 132 through portions thereof alternately exposed to the both end surfaces of the ceramic body 110, respectively.

Therefore, when voltage is applied to the first and second external electrodes 131 and 132, electrical charges are accumulated between the first and second internal electrodes 121 and 122 facing each other. In this case, a capacitance of the multilayer ceramic capacitor 100 may be in proportion to an area of an overlapped region between the first and second internal electrodes 121 and 122.

The thickness of each of the first and second internal electrodes 121 and 122 may be determined according to an intended use thereof. For example, the thickness of each of the first and second internal electrodes 121 and 122 may be determined in a range of 0.2 to 1.0 μm in consideration of a size of the ceramic body 110, but the present disclosure is not limited thereto.

Further, the conductive metal contained in the conductive paste forming the first and second internal electrodes 121 and 122 may be nickel (Ni), copper (Cu), palladium (Pd), or an alloy thereof, but the present disclosure is not limited thereto.

Further, as a printing method of the conductive paste, a screen printing method, a gravure printing method, or the like, maybe used, but the present disclosure is not limited thereto.

Meanwhile, the first and second external electrodes 131 and 132 may be formed of a conductive paste containing a conductive metal, wherein the conductive metal may be nickel (Ni), copper (Cu), palladium (Pd), gold (Au), or an alloy thereof, but the present disclosure is not limited thereto.

According to an exemplary embodiment of the present disclosure, the cover layer may include the plurality of dummy electrode layers 123 including central portions thereof disposed in positions corresponding to edges of the first and second external electrodes formed on upper and lower surfaces of the ceramic body and having a predetermined length.

Generally, as the multilayer ceramic electronic component has been used in fields of application requiring high reliability such as vehicles, medical devices, and the like, demands have been made for the multilayer ceramic electronic component to have high reliability.

In securing high reliability, defects such as cracks generated in components due to external impacts, malfunction of an apparatus caused by the occurrence of the cracks, and the like may be present.

Research into the development of a technology and a product for preventing a warpage crack from being generated in the multilayer ceramic electronic component has been continuously conducted, but there is a limitation.

Specifically, in order to prevent the occurrence of short-circuits due to warpage cracks, a method of increasing a margin in a length direction, a method of using a lead frame during a mounting process, a method of manufacturing an external electrode using an impact absorbing material, or the like, has been used.

However, it is difficult to apply the method of increasing the margin in the length direction to a high capacitance multilayer ceramic electronic component, and a method of applying a polymer material such as epoxy or the like, to an external electrode may also have a limitation in securing warpage strength.

Further, in the method of using a metal lead frame, a high manufacturing cost may occur and a mounting area and a height may be restricted.

According to an exemplary embodiment of the present disclosure, the cover layer may include the plurality of dummy electrode layers 123 including central portions thereof disposed in positions corresponding to the edges of the first and second external electrodes 131 and 132 formed on the upper and lower surfaces of the ceramic body 110, and having a predetermined length, such that the limitations described above may be solved.

That is, bending strength characteristics of the multilayer ceramic capacitor and strength thereof against external impacts may be improved by stacking the dummy electrodes in the upper or lower cover layer, that is, in the exterior of the outermost internal electrodes, and controlling the number and positions of the stacked dummy electrodes.

In detail, when the thickness of the ceramic body 110 is defined as T, the number of the first and second internal electrodes 121 and 122 is defined as AL, the thickness of each of the first and second internal electrodes 121 and 122 is defined as AT, the thickness of each of the dummy electrode layers 123 is defined as DT, and the number of the dummy electrode layers 123 stacked in the cover layer is defined as DL, DL may be equal to $\{(T \times x)-(AL \times AT)\}/DT$, and x may be 9.0% or more.

As described above, the number DL of the stacked dummy electrode layers 123 is equal to $\{(T \times x)-(AL \times AT)\}/DT$ ($DL=\{(T \times x)-(AL \times AT)\}/DT$), x being 9.0% or more, such that the bending strength characteristics of the multilayer ceramic capacitor and strength thereof against external impacts may be improved.

Particularly, x may be in a range of 9.0 to 16.2% ($9.0\% \leq x \leq 16.2\%$), such that the bending strength characteristics of the multilayer ceramic capacitor and strength thereof against external impacts may be improved.

In this case, x may refer to a ratio of a sum of the thickness DT of each of the dummy electrode layers 123 and the number DL of the dummy electrode layers 123 stacked in the cover layer, to the overall thickness of the ceramic body 110.

In a case in which x is less than 9.0%, the bending strength characteristics of the multilayer ceramic capacitor and strength thereof against external impacts may be deteriorated, to cause defects in reliability.

In a case in which x exceeds 16.2%, the bending strength characteristics of the multilayer ceramic capacitor and strength thereof against external impacts may be improved, but the number of the stacked dummy electrodes may be excessively increased, such that it may be difficult to implement a high capacitance multilayer ceramic capacitor.

Meanwhile, when the number DL of the dummy electrode layers 123 stacked in the cover layer is equal to $\{(T \times x)-(AL \times AT)\}/DT$ ($DL=\{(T \times x)-(AL \times AT)\}/DT$), x being 9.0% or more, the number DL of the stacked dummy electrode layers may be in a range of 42 to 92 ($42 \leq DL \leq 92$).

The number DL of the stacked dummy electrode layers 123 maybe in a range of 42 to 92 ($42 \leq DL \leq 92$), such that the bending strength characteristics of the multilayer ceramic capacitor and strength thereof against external impacts may be improved.

In a case in which the number DL of the stacked dummy electrode layers 123 is less than 42, the bending strength characteristics of the multilayer ceramic capacitor and strength thereof against external impacts may be deteriorated, to cause defects in reliability.

In a case in which the number DL of the stacked dummy electrode layers exceeds 92, the bending strength characteristics of the multilayer ceramic capacitor and strength thereof against external impacts may be improved, but the number of the stacked dummy electrode layers may be excessively increased, such that it may be difficult to implement a high capacitance multilayer ceramic capacitor.

Meanwhile, the dummy electrode layers 123 may include the central portions thereof disposed in positions corresponding to the edges of the first and second external electrodes formed on the upper and lower surfaces of the ceramic body 110, and may have a length of 40 µm or more.

That is, when a virtual line is drawn from the edge of the first or second external electrode 131 and 132 formed on the upper or lower surface of the ceramic body 110 toward the cover layer, the length of the dummy electrode layers 123 may be 40 µm or more in the length direction of the ceramic body, based on points at which the virtual line intersects with the dummy electrode layers 123.

As described above, when the central portions of the dummy electrode layers 123 may be disposed in positions corresponding to the edges of the first and second external electrodes formed on the upper and lower surfaces of the ceramic body 110, and the length of the dummy electrode layers 123 may be 40 µm or more in the length direction of the ceramic body 110, bending strength characteristics of the multilayer ceramic capacitor and strength thereof against external impacts may be improved.

When the central portions of the dummy electrode layers 123 may be disposed in positions corresponding to the edges of the first and second external electrodes formed on the upper and lower surfaces of the ceramic body 110, but the length of the dummy electrode layers 123 may be less than 20 µm in the length direction of the ceramic body 110, bending strength characteristics of the multilayer ceramic capacitor and strength thereof against external impacts may be deteriorated to cause a defect in reliability.

In an exemplary embodiment of the present disclosure, the dummy electrode layers 123 may be exposed to the both end surfaces of the ceramic body 110, but the present disclosure is not limited thereto.

Meanwhile, the multilayer ceramic capacitor 100 according to another exemplary embodiment of the present disclosure may include: the ceramic body 110 including the dielectric layers 111; the first and second internal electrodes 121 and 122 disposed in the ceramic body 110 to face each other, having the dielectric layers interposed therebetween 111; and the first and second external electrodes 131 and 132 formed to cover both end surfaces of the ceramic body 110, wherein the ceramic body includes an active layer, a capacitance formation portion, and a cover layer, a non-capacitance formation portion, formed on at least one of upper and lower surfaces of the active layer, the cover layer includes the plurality of dummy electrode layers 123 including central portions thereof disposed in positions corresponding to edge portions of the first and second external electrodes 131 and 132 formed on upper and lower surfaces of the ceramic body, and having a predetermined length, and when the number of the dummy electrode layers 123 stacked in the cover layer is defined as DL, DL is in a range of 42 to 92 ($42 \leq DL \leq 92$).

When a thickness of the ceramic body 110 is defined as T, the number of the first and second internal electrodes 121 and 122 is defined as AL, a thickness of each of the first and second internal electrodes is defined as AT, a thickness of each of the dummy electrode layers 123 is defined as DT, and the number of the dummy electrode layers 123 stacked in the cover layer is defined as DL, the number DL of the stacked dummy electrode layers 123 may be $\{(T \times x)-(AL \times AT)\}/DT$, and in this case, x may be in a range of 9.0% to 16.2% ($9.0\% \leq x \leq 16.2$).

In describing the multilayer ceramic capacitor according to another exemplary embodiment of the present disclosure, a description thereof overlapped with the description of the above-mentioned multilayer ceramic electronic component according to the exemplary embodiment of the present disclosure will be omitted.

In a manufacturing method of a multilayer ceramic electronic component according to an exemplary embodiment of the present disclosure, first, ceramic green sheets may be prepared using a slurry containing a ceramic powder and an additive.

The ceramic green sheets may be manufactured by mixing the ceramic powder, a binder, and a solvent to prepare the slurry and forming the prepared slurry in sheet shapes each having a thickness of several µm by a doctor blade method.

Then, internal electrode patterns may be formed on the ceramic green sheets using a conductive metal paste.

Next, the green sheets on which the internal electrode patterns are formed may be stacked and sintered, thereby forming a ceramic body including dielectric layers and first and second internal electrodes disposed to face each other, having the dielectric layers interposed therebetween.

The ceramic body of the multilayer ceramic electronic component manufactured by the manufacturing method according to another exemplary embodiment of the present disclosure may include an active layer, a capacitance formation part, and a cover layer, a non-capacitance formation part, formed on at least one of upper and lower surfaces of the active layer, and the cover layer may include a plurality of dummy electrode layers including central portions thereof disposed in positions corresponding to edges of the first and second external electrodes formed on upper and lower surfaces of the ceramic body, and having a predetermined length.

Other features thereof overlapped with those of the above-mentioned multilayer electronic component according to the exemplary embodiment of the present disclosure will be omitted.

internal electrodes, the thickness DT of each of the dummy electrode layers, and the number DL of the stacked dummy electrode layers.

TABLE 1

| Sample No. | Thickness T of Ceramic Body (mm) | The Number AL of First and Second Internal Electrodes | Thickness AT of Each of First and Second Internal Electrode (µm) | Thickness DT of Each of Dummy Electrode Layers (µm) | The Number DL of Stacked Dummy Electrode Layers | Bending Strength Test Result | Percentage (%) Based on Thickness T of Ceramic Body |
|---|---|---|---|---|---|---|---|
| *1 | 0.760 | 20 | 1.10 | 1.10 | 2 | NG | 3.2 |
| *2 | | | | | 12 | NG | 4.6 |
| *3 | | | | | 22 | NG | 6.1 |
| *4 | | | | | 32 | NG | 7.5 |
| 5 | | | | | 42 | OK | 9.0 |
| 6 | | | | | 52 | OK | 10.4 |
| 7 | | | | | 62 | OK | 11.9 |
| 8 | | | | | 72 | OK | 13.3 |
| 9 | | | | | 82 | OK | 14.8 |
| 10 | | | | | 92 | OK | 16.2 |

*Comparative Example

Hereafter, although the present disclosure will be described in detail with reference to Inventive Examples, the present disclosure is not limited thereto.

Inventive Examples were provided to test bending strength characteristics of multilayer ceramic capacitors each including an active layer, a capacitance formation part, and a cover layer, a non-capacitance formation part, formed on at least one of upper and lower surfaces of the active layer, depending on a thickness T of the ceramic body, the number AL of the first and second internal electrodes, a thickness AT of each of the first and second internal electrodes, a thickness DT of each of the dummy electrode layers, and the number DL of the stacked dummy electrode layers.

The respective multilayer ceramic capacitors according to Inventive Examples were manufactured as follows.

First, a slurry containing a powder such as a barium titanate ($BaTiO_3$) powder, or the like, was applied to carrier films and dried thereon to prepare a plurality of ceramic green sheets, thereby forming dielectric layers.

Next, a conductive paste for an internal electrode was prepared and applied to the green sheets by a screen printing method to form internal electrodes, and then, the green sheets are stacked, thereby manufacturing a multilayer body.

Particularly, ceramic green sheets having dummy electrode patterns formed thereon were additionally stacked on an upper or lower portion of the multilayer body, thereby manufacturing a multilayer body including an upper or lower cover layer.

Then, the multilayer body was compressed and cut into chips each having a 1608 standard size, and the chip was sintered at 1050 to 1200° C. under a reduction atmosphere in which $H_2$ is 0.1% or less.

Next, the chip was subjected to processes such as an external electrode forming process, a plating process, and the like, thereby manufacturing the multilayer ceramic capacitor.

The following Table 1 shows data obtained by comparing the bending strength characteristics of the multilayer ceramic capacitors, depending on the thickness T of the ceramic body, the number AL of the first and second internal electrodes, the thickness AT of each of the first and second Referring to [Table 1], it may be appreciated that in samples 5 to 10, Inventive Examples, when the number DL of the stacked dummy electrode layers 123 was in a range of 42 to 92 ($42 \leq DL \leq 92$) and was equal to $\{(T \times x)-(AL \times AT)\}/DT$, and x was in a range of 9.0% to 16.2% ($9.0\% \leq x \leq 16.2\%$), the bending strength test result was good.

On the other hand, it may be appreciated that in the case of samples 1 to 4 in which the number DL of the stacked dummy electrode layers 123 was out of the numerical range of the present disclosure, the bending strength test result was defective.

Board Having Multilayer Ceramic Capacitor Mounted Thereon

Figure 4:
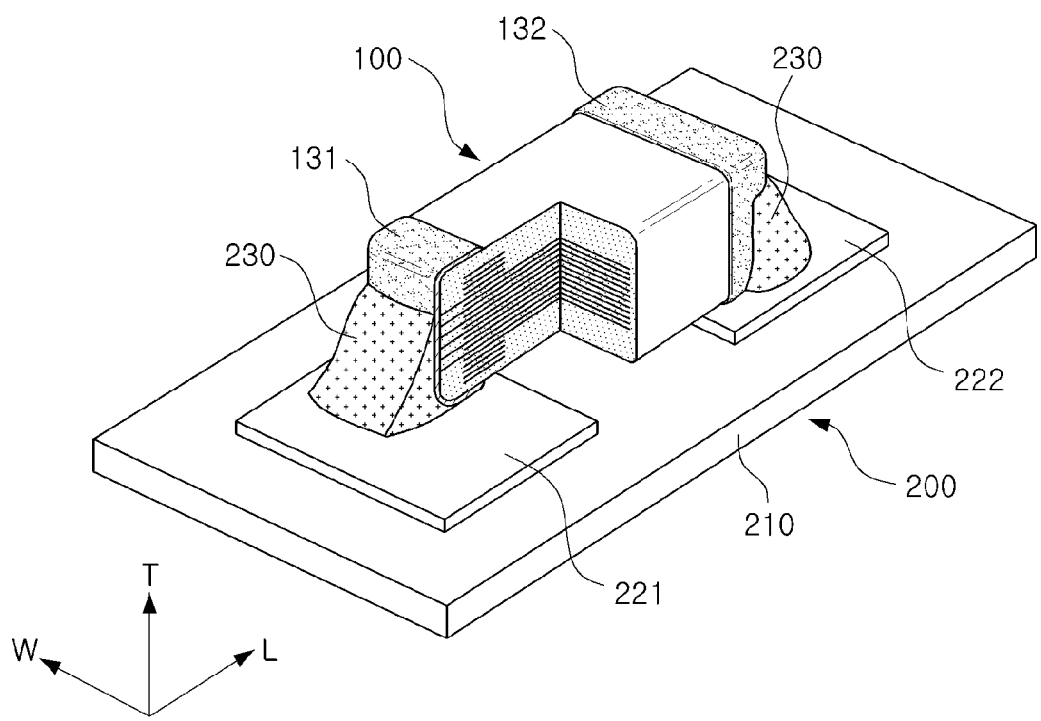
FIG. 4 is a perspective view showing a state in which the multilayer ceramic capacitor of FIG. 1 is mounted on a printed circuit board.

FIG. 4 is a perspective view showing a state in which the multilayer ceramic capacitor of FIG. 1 is mounted on a printed circuit board.

Referring to FIG. 4, a board 200 having the multilayer ceramic capacitor 100 mounted thereon according to an exemplary embodiment of the present disclosure may include a printed circuit board 210 on which the multilayer ceramic capacitor 100 is horizontally disposed with respect to the board 210 and first and second electrode pads 221 and 222 formed on the printed circuit board 210 to be spaced apart from each other.

In this case, the multilayer ceramic capacitor 100 may be electrically connected to the printed circuit board 210 by soldering parts 230 in a state in which a lower cover layer 113 is downwardly disposed and the first and second external electrodes 131 and 132 are positioned on the first and second electrode pads 221 and 222 to come into contact therewith, respectively.

In the multilayer ceramic capacitor according to an exemplary embodiment of the present disclosure, the cover layer may include the plurality of dummy electrode layers 123, and the number DL of the stacked dummy electrode layers 123 may be in a range of 42 to 92 ($42 \leq DL \leq 92$) and be equal to $\{(T \times x)-(AL \times AT)\}/DT$, x being in a range of 9.0% to 16.2% ($9.0\% \leq x \leq 16.2\%$), such that at the time of mounting the multilayer ceramic capacitor on the board, the occurrence of warpage cracks may be decreased, thereby leading to excellent reliability.

As set forth above, according to exemplary embodiments of the present disclosure, the bending strength characteristics of the multilayer ceramic electronic component and strength thereof against external impacts may be improved by stacking the dummy electrodes in the upper or lower cover layer, that is, in the exterior of the outermost internal electrodes, and controlling the number and positions of the stacked dummy electrodes.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic capacitor comprising:
a ceramic body including dielectric layers;
first and second internal electrodes disposed in the ceramic body to face each other, having the dielectric layers interposed therebetween; and
first and second external electrodes formed to cover both end surfaces of the ceramic body,
wherein the ceramic body includes an active layer, a capacitance formation portion, and a cover layer, a non-capacitance formation portion, formed on at least one of upper and lower surfaces of the active layer,
the cover layer includes a plurality of dummy electrode layers including central portions thereof disposed in positions corresponding to edges of the first and second external electrodes formed on upper and lower surfaces of the ceramic body, and having a predetermined length, and
when a thickness of the ceramic body is defined as T, a number of the first and second internal electrodes is defined as AL, a thickness of each of the first and second internal electrodes is defined as AT, a thickness of each of the dummy electrode layers is defined as DT, and a number of the dummy electrode layers stacked in the cover layer is defined as DL, DL is equal to $\{(T \times x)-(AL \times AT)\}/DT$, x is in a range of 9.0% to 16.2% and x is defined as the value of the internal and dummy electrodes region thickness divided by the total thickness of the ceramic body, and the dummy electrode layers are distant from the end surfaces of the ceramic body, with a predetermined distance.

2. The multilayer ceramic capacitor of claim 1, wherein the number DL of the stacked dummy electrode layers is in a range of 42 to 92.

3. A board having a multilayer ceramic capacitor mounted thereon, the board comprising:
a printed circuit board having first and second electrode pads formed thereon; and
the multilayer ceramic capacitor mounted on the printed circuit board, and including a ceramic body including dielectric layers; first and second internal electrodes disposed in the ceramic body to face each other, having the dielectric layers interposed therebetween; and first and second external electrodes formed to cover both end surfaces of the ceramic body,
wherein the ceramic body includes an active layer, a capacitance formation portion, and a cover layer, a non-capacitance formation portion, formed on at least one of upper and lower surfaces of the active layer,
the cover layer includes a plurality of dummy electrode layers including central portions thereof disposed in positions corresponding to edges of the first and second external electrodes formed on upper and lower surfaces of the ceramic body, and having a predetermined length, and
when a thickness of the ceramic body is defined as T, a number of the first and second internal electrodes is defined as AL, a thickness of each of the first and second internal electrodes is defined as AT, a thickness of each of the dummy electrode layers is defined as DT, and a number of the dummy electrode layers stacked in the cover layer is defined as DL, DL is equal to $\{(T \times x)-(AL \times AT)\}/DT$, x is in a range of 9.0% to 16.2%, and x is defined as the value of the internal and dummy electrodes region thickness divided by the total thickness of the ceramic body, and the dummy electrode layers are distant from the end surfaces of the ceramic body, with a predetermined distance.

4. The multilayer ceramic capacitor of claim 1, wherein the central portions of the dummy electrode layers are disposed in the positions corresponding to the edges of the first and second external electrodes formed on the upper and lower surfaces of the ceramic body, and the dummy electrode layers have a length of 40 μm or more.

5. The board of claim 3, wherein the number DL of the stacked dummy electrode layers is in a range of 42 to 92.

6. The board of claim 3, wherein the central portions of the dummy electrode layers are disposed in the positions corresponding to the edges of the first and second external electrodes formed on the upper and lower surfaces of the ceramic body, and the dummy electrode layers have a length of 40 μm or more.

* * * * *